(12) United States Patent
Mont et al.

(10) Patent No.: US 7,398,393 B2
(45) Date of Patent: Jul. 8, 2008

(54) PRIVACY MANAGEMENT OF PERSONAL DATA

(75) Inventors: Marco Casassa Mont, Bristol (GB); Keith Alexander Harrison, Chepstow (GB); Martin Sadler, Bristol (GB); Siani Lynne Pearson, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 925 days.

(21) Appl. No.: 10/767,868

(22) Filed: Jan. 28, 2004

(65) Prior Publication Data

US 2005/0039031 A1 Feb. 17, 2005

(30) Foreign Application Priority Data

Jan. 31, 2003 (GB) .................... 0302270.4
Feb. 24, 2003 (GB) .................... 0304049.0
May 29, 2003 (GB) .................... 0312229.8

(51) Int. Cl.
*H04L 9/32* (2006.01)

(52) U.S. Cl. ............................. 713/168; 713/170; 726/1

(58) Field of Classification Search ......... 713/168–170; 726/1

See application file for complete search history.

(56) References Cited

U.S. PATENT DOCUMENTS 6,349,338 B1* 2/2002 Seamons et al. ............ 709/229
2002/0031230 A1* 3/2002 Sweet et al. ................ 380/278
2002/0035556 A1* 3/2002 Shah et al. .................. 707/1

FOREIGN PATENT DOCUMENTS

WO    WO 00/52557    9/2000
WO    WO 02/15530    2/2002

OTHER PUBLICATIONS

B. Balacheff, L. Chen, S. Pearson et al. "Trustec Computing Platforms: TCPA Technology in Context" © 2002 Prentice Hall excerpts from Chapter 2 (6 pages).*
Levy, I., "Identifier Based PKC-Potential Applications," 1st Annual PKI Research Workshop—Archival Material, Internet: <http://www.cs.darthmouth.edu/~pki02/Levy/index.shtml> 22 pages total (Jul. 29, 2002).

(Continued)

*Primary Examiner*—Kimyen Vu
*Assistant Examiner*—Thomas Gyorfi
(74) *Attorney, Agent, or Firm*—Ladas & Parry, LLP (57) ABSTRACT

When sending personal data to a recipient, the data owner encrypts the data using both a public data item provided by a trusted party and an encryption key string formed using at least policy data indicative of conditions to be satisfied before access is given to the personal data. The encryption key string is typically also provided to the recipient along with the encrypted personal data. To decrypt the personal data, the recipient sends the encryption key string to the trusted party with a request for the decryption key. The trusted party determines the required decryption key using the encryption key string and private data used in deriving its public data, and provides it to the requesting recipient. However, the decryption key is either not determined or not made available until the trusted party is satisfied that the associated policy conditions have been met by the recipient.

60 Claims, 5 Drawing Sheets

OTHER PUBLICATIONS

Karjoth, G., et al. "A Privacy Model for Enterprises," IBM Research, Zurich—15th IEEE Computer Foundations Workshop—Jun. 2002.

Karjoth, G., et al. "Platform for Enterprise Privacy Practices: Privacy-enabled Management of Customer Data," —2nd Workshop on Privacy Enhancing Technologies, Lecture Notes in Computer Science, Springer Verlang—2002.

Cocks, C., "An Identity Based Encryption Scheme Based on Quadratic Residues," Proceedings of the 8th IMA International Conference on Cryptography and Coding, LNCS 2260, pp. 360-363, Springer-Verlag 2001.

Boneh, Dan, et al. "Identity-Based Encryption from the Weil Pairing" *Advances in Cryptology—CRYPTO*2001, LNCS 2139, pp. 213-229, Springer-Verlag, 2001.

Boneh, Dan, et al. "Identity-Based Mediated RSA," 3rd Workshop on Information Security Application, Jeju Island, Korea, Aug. 2002.

Chen, L. et al. "Certification of Public Keys Within an Identity Based System," LNCS 2433, ed. Goos, G., Hartmanis, J., van Leeuwen, J., Proceedings of Information Security, pp. 332-333, 2002.

TCPA—Trusted Computing Platform Alliance Main Specification v1.1, www.trustedcomputing.org, 2001.

* cited by examiner

PRIVACY MANAGEMENT OF PERSONAL DATA

RELATED APPLICATIONS

This application is related to U.S. patent application Ser. No. 10/270,039 filed Oct. 11, 2002 (now U.S. Pat. No. 7,219, 226) and divisional application based thereon, U.S. patent application Ser. No. 11/644,862 filed Dec. 21, 2006.

FIELD OF THE INVENTION

The present invention relates to privacy management of personal data.

As used herein, the term "personal data" is intended to include data such as identity data and profile data (for example, preference data and financial data) of a party to which the data relates, whether that party is a natural or legal party. Furthermore, references to the "owner" of the personal data means the party responsible for its disclosure, whether the party is the subject of the data or a proxy for that party.

BACKGROUND OF THE INVENTION

Digital identities and profiles of parties are becoming more and more relevant for enabling Internet transactions and interactions among citizens, service providers, enterprises and government institutions. For example, in an e-commerce scenario, a person initially provides their digital identity and profile information to an e-commerce site in order to access their services. After the user logs in and interacts with these services: it might happen that interaction with other web sites or organisations is needed to carry out a service. The user might be conscious of this or this might take place behind the scene, for example due to fact that the e-commerce site interacts with partners and suppliers. The e-commerce sites may or may not have prior agreements with these third parties or may or may not belong to the same web of trust.

In general users have little understanding or knowledge of the privacy laws and legislation that regulate the management of their information. The privacy and data protection laws that regulate this area are hard to enforce or monitor, especially when private information is spread across organisations and national boundaries. People perceive and address the related security and privacy issues in different ways, ranging from completely ignoring them (and indiscriminately disclosing their personal data), to being so concerned as to refrain from using any Internet applications. It is also frequently the case that users do not bother to read long lists of terms and conditions concerning privacy and confidentiality because they cannot understand them or do not have the time to do so. Thus, whilst users are often asked to grant authority to web sites to electronically manage their information, in many cases the user doesn't consider the implications of such a request and simply chooses the easiest way forward to obtaining the service they want.

Little has been done so far to allow the explicit management and enforcement of privacy policies by directly involving users (or entities acting on their behalf) especially in a context of multiparty interactions. Users have a lack of control over their personal information, especially after its initial disclosure. In addition, third parties (such as delegates, e-commerce sites or enterprises) have lack of control over the confidential information they manage on behalf of their customers, in particular when they disclose it to external entities, during transactions or interactions.

Privacy management solutions can play a key role in protecting identities and profiles, enforcing good management practices and helping to detect criminal activities and support forensic analysis. However, for such solution to succeed, they need to simplify users' experience so that people can feel they are in control of their personal data and that this data is managed in an accountable way. If people are not willing to be involved in the active protection and management of their digital assets, trusted third parties could do this on their behalf and could provide people with easy-to-use tools to monitor and keep the situation under control.

Mechanisms such as proposed by W3C allow users to define simple privacy policies but this is only meaningful for point-to-point interactions (see: "The Platform for privacy preferences 1.0 specification (P3P 1.0)." http://www.w3.org/tr/p3p—W3C Proposed Recommendation—2002)

Solutions based on federated identity management have also been implemented (such as Microsoft Passport) but, at least currently, rely on a closed web of trust. Identity providers must be part of trusted clubs and be compliant with predefined privacy policies. This approach limits scalability and flexibility of the allowed interactions and transactions.

A more fine-grained control over the privacy of personal data has been described in the papers:

G. karjoth, M. Hunter—A Privacy Policy Model for Enterprises, IBM Research, Zurich—15$^{th}$ IEEE Computer Foundations Workshop—June 2002

G. karjoth, M. Schunter, M. Waidner—Platform for Enterprise Privacy Practices: Privacy-enabled Management of Customer Data—2nd Workshop on Privacy Enhancing Technologies, Lecture Notes in Computer Science, Springer Verlang—2002

In the first of these papers the authors define a privacy control language that includes user consent, obligations and distributed administration. In the second paper, the authors describe a platform for enterprise privacy practices (E-P3P) and introduce the "sticky policy" paradigm and mechanisms for enterprise privacy enforcement. Sticky policies are policies that are strictly associated with a user's data and drive access control decisions and privacy enforcement. The papers do not, however, describe how the strong associations between policies and confidential data are enforced, especially across enterprise boundaries. Users still need to trust the enterprise when disclosing their data. Leakage of personal and confidential information might happen, despite data protection laws and privacy policies, because of lack of security, dishonesty of some of the involved intermediaries and the complexity of the overall systems.

Furthermore, many of the current privacy mechanisms introduce an overhead in terms of usage of digital certificates at the user site (where data is encrypted) and complexity when dealing with dynamic metadata (policies) associated with the encrypted data It is an object of the present invention to provide an improved way of effecting privacy management for personal data.

The present invention is in part based on the appreciation that Identifier-Based Encryption (IBE) has certain properties than can be adapted for use in privacy management.

Identifier-Based Encryption (IBE) is an emerging cryptographic schema. In this schema (see FIG. 1 of the accompanying drawings), a data provider 10 encrypts payload data 13 using both an encryption key string 14, and public data 15 provided by a trusted authority 12. This public data 15 is derived by the trusted authority 12 using private data 17 and a one-way function 18. The data provider 10 then provides the encrypted payload data <13> to a recipient 11 who decrypts it, or has it decrypted, using a decryption key computed by the trusted authority 12 in dependence on the encryption key string and its own private data.

A feature of identifier-based encryption is that because the decryption key is generated from the encryption key string, its generation can be postponed until needed for decryption.

Another feature of identifier-based encryption is that the encryption key string is cryptographically unconstrained and can be any kind of string, that is, any ordered series of bits whether derived from a character string, a serialized image bit map, a digitized sound signal, or any other data source. The string may be made up of more than one component and may be formed by data already subject to upstream processing. In order to avoid cryptographic attacks based on judicious selection of a key string to reveal information about the encryption process, as part of the encryption process the encryption key string is passed through a one-way function (typically some sort of hash function) thereby making it impossible to choose a cryptographically-prejudicial encryption key string. In applications where defence against such attacks is not important, it would be possible to omit this processing of the string.

Typically, the encryption key string serves to "identify" the intended message recipient and the trusted authority is arranged to provide the decryption key only to this identified intended recipient. This has given rise to the use of the label "identifier-based" or "identity-based" generally for cryptographic methods of the type under discussion. However, as will be seen hereinafter, the string may serve a different purpose to that of identifying the intended recipient. Accordingly, the use of the term "identifier-based" or "IBE" herein in relation to cryptographic methods and systems is to be understood simply as implying that the methods and systems are based on the use of a cryptographically unconstrained string whether or not the string serves to identify the intended recipient. Generally, in the present specification, the term "encryption key string" or "EKS" is used rather than "identity string" or "identifier string"; the term "encryption key string" may also used in the shortened form "encryption key" for reasons of brevity.

Figure 2:
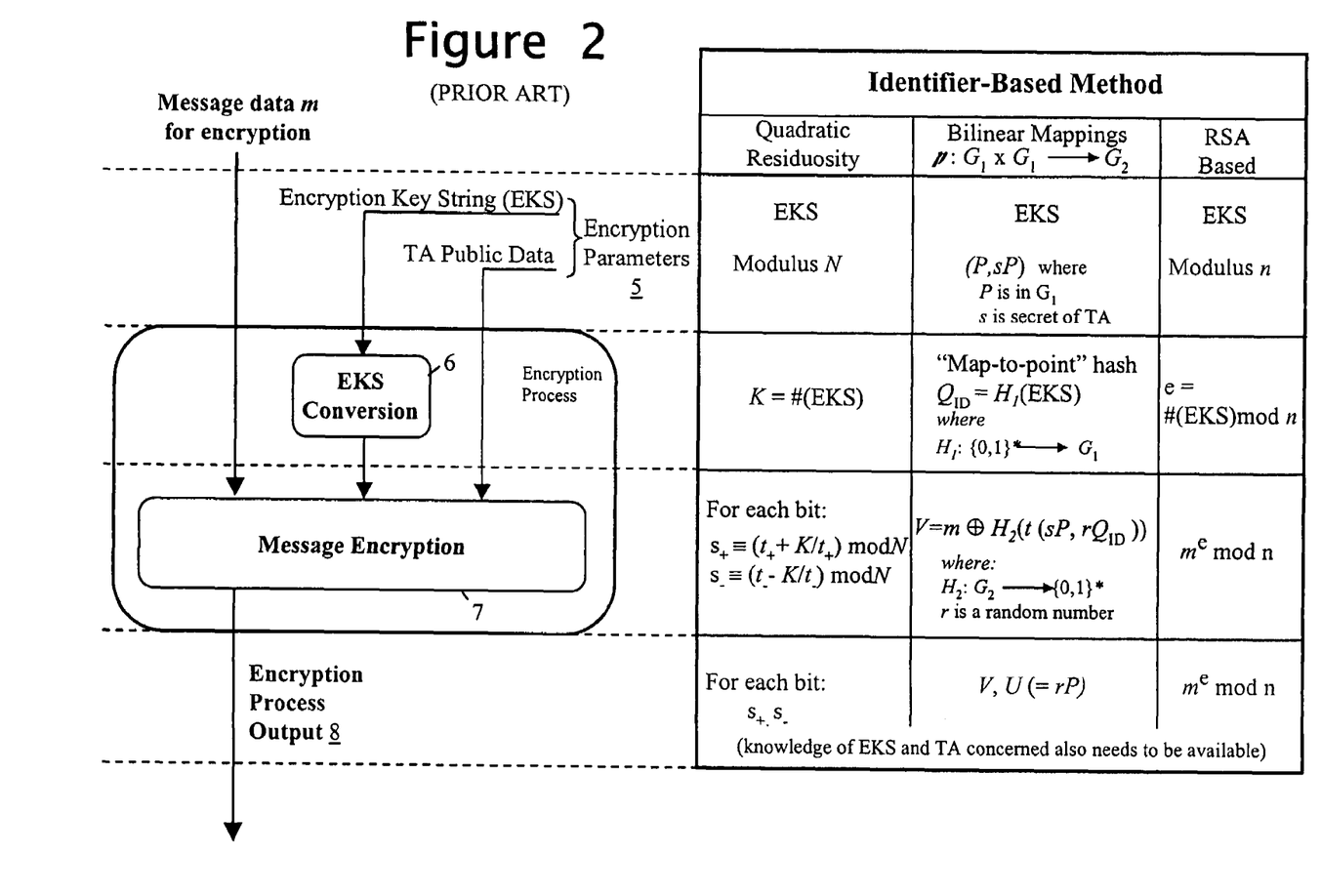
FIG. 2 is a diagram illustrating how certain IBE operations are implemented by three different prior art IBE methods.

A number of IBE algorithms are known and FIG. 2 indicates, for three such algorithms, the following features, namely:

- the form of the encryption parameters 5 used, that is, the encryption key string and the public data of the trusted authority (TA);
- the conversion process 6 applied to the encryption key string to prevent attacks based on judicious selection of this string;
- the primary encryption computation 7 effected;
- the form of the encrypted output 8.

The three prior art IBE algorithms to which FIG. 2 relates are:

Quadratic Residuosity (QR) method as described in the paper: C. Cocks, "An identity based encryption scheme based on quadratic residues", Proceedings of the 8$^{th}$ IMA International Conference on Cryptography and Coding, LNCS 2260, pp 360-363, Springer-Verlag, 2001. A brief description of this form of IBE is given hereinafter.

Bilinear Mappings p using, for example, a modified Tate pairing t or modified Weil pairing e for which:

$$p: G_1 \times G_1 \to G_2$$

where $G_1$ and $G_2$ denote two algebraic groups of prime order q and $G_2$ is a subgroup of a multiplicative group of a finite field. For the Tate pairing an asymmetric form is also possible:

$$p: G_1 \times G_0 \to G_2$$

where $G_0$ is a further algebraic group the elements of which are not restricted to being of order q. Generally, the elements of the groups $G_0$ and $G_1$ are points on an elliptic curve though this is not necessarily the case. A description of this form of IBE method, using modified Weil pairings is given in the paper: D. Boneh, M. Franklin—"Identity-based Encryption from the Weil Pairing" in *Advances in Cryptology—CRYPTO 2001*, LNCS 2139, pp. 213-229, Springer-Verlag, 2001.

RSA-Based methods The RSA public key cryptographic method is well known and in its basic form is a two-party method in which a first party generates a public/private key pair and a second party uses the first party's public key to encrypt messages for sending to the first party, the latter then using its private key to decrypt the messages. A variant of the basic RSA method, known as "mediated RSA", requires the involvement of a security mediator in order for a message recipient to be able to decrypt an encrypted message. An IBE method based on mediated RSA is described in the paper "Identity based encryption using mediated RSA", D. Boneh, X. Ding and G. Tsudik, 3rd Workshop on Information Security Application, Jeju Island, Korea, August, 2002.

In all of the above cases, the decryption key is generated by a trusted authority in dependence on the encryption key string.

A more detailed description of the QR method is given below with reference to the entities depicted in FIG. 1 and using the same notation as given for this method in FIG. 2. In the QR method, the trust authority's public data 15 comprises a value N that is a product of two random prime numbers p and q, where the values of p and q are the private data 17 of the trust authority 12. The values of p and q should ideally be in the range of $2^{511}$ and $2^{512}$ and should both satisfy the equation: p, q≡3 mod 4. However, p and q must not have the same value. Also provided is a hash function # which when applied to a string returns a value in the range 0 to N−1.

Each bit of the user's payload data 13 is then encrypted as follows:

The data provider 10 generates random numbers $t_+$ (where $t_+$ is an integer in the range [0, $2^N$]) until a value of $t_+$ is found that satisfies the equation jacobi($t_+$,N)=m', where m' has a value of −1 or 1 depending on whether the corresponding bit of the user's data is 0 or 1 respectively. (As is well known, the jacobi function is such that where $x^2 \equiv \#modN$ the jacobi (#, N)=−1 if x does not exist, and=1 if x does exist). The data provider 10 then computes the value:

$$s_+ \equiv (t_+ + K/t_+) \mod N$$

where: $s_+$ corresponds to the encrypted value of the bit m' concerned, and

K=#(encryption key string)

Since K may be non-square, the data provider additionally generates additional random numbers t (integers in the range [0, $2^N$)) until one is found that satisfies the equation jacobi($t_-$,N)=m'. The data provider 10 then computes the value:

$$s_- \equiv (t_- - K/t_-) \mod N$$

as the encrypted value of the bit m concerned.

The encrypted values $s_+$ and $s_-$ for each bit m' of the user's data are then made available to the intended recipient 11, for example via e-mail or by being placed in an electronic public area; the identity of the trust authority 12 and the encryption key string 14 will generally also be made available in the same way.

The encryption key string 14 is passed to the trust authority 12 by any suitable means; for example, the recipient 11 may pass it to the trust authority or some other route is used—indeed, the trust authority may have initially provided the encryption key string. The trust authority 12 determines the associated private key B by solving the equation:

$$B^2 \equiv K \bmod N \text{ ("positive" solution)}$$

If a value of B does not exist, then there is a value of B that is satisfied by the equation:

$$B^2 \equiv -K \bmod N \text{ ("negative" solution)}$$

As N is a product of two prime numbers p, q it would be extremely difficult for any one to calculate the decryption key B with only knowledge of the encryption key string and N. However, as the trust authority 12 has knowledge of p and q (i.e. two prime numbers) it is relatively straightforward for the trust authority 12 to calculate B.

Any change to the encryption key string 14 will result in a decryption key 16 that will not decrypt the payload data 13 correctly. Therefore, the intended recipient 11 cannot alter the encryption key string before supplying it to the trust authority 12.

The trust authority 12 sends the decryption key to the data recipient 11 along with an indication of whether this is the "positive" or "negative" solution for B.

If the "positive" solution for the decryption key has been provided, the recipient 11 can now recover each bit m' of the payload data 13 using:

$$m' = \text{jacobi}(s_+ + 2B, N)$$

If the "negative" solution for the decryption key B has been provided, the recipient 11 recovers each bit m' using:

$$m' = \text{jacobi}(s_- + 2B, N)$$

SUMMARY OF THE INVENTION

In general terms, the present invention involves using a privacy policy as an IBE encryption key string for the personal data to which it relates thereby tightly associating the policy and data and requiring the policy to be disclosed, unaltered, to the trust authority who has the ability to provide the decryption key. The trust authority then has the responsibility of ensuring that the policy conditions have been satisfied before it releases the decryption key. No secret needs to be generated and exchanged between users and the receivers of confidential information.

More particularly, according to one aspect of the present invention, there is provided a privacy management method, comprising:

first operations, effected by an owner of personal data, comprising:

encrypting that data based on encryption parameters comprising an encryption key string formed using at least policy data indicative of conditions, differing from recipient identity, to be satisfied before access is given to said personal data, and public data provided by a trusted party and related to private data of the latter, providing the encrypted data to a recipient;

second operations, effected by the trusted party, comprising using the encryption key string and said private data to determine a decryption key, and outputting this key; at least one of these second operations only being effected after a further second operation has checked that said conditions are satisfied regarding said recipient.

The conditions to be satisfied may relate to the authenticity of the recipient, the security rating of the computing platform used by the recipient, a "use-before" date for the policy or data, etc; a condition may also be that the trusted party communicate with the owner of the personal data either by way of a simple notification or to get permission to deliver the decryption key.

The trusted party preferably keeps an audit record of each decryption key it delivers and each failed request for a key.

According to another aspect of the present invention, there is provided a privacy management system comprising first, second and third computing entities, wherein:

the first computing entity comprises: a data store for holding personal data; an encryption unit for encrypting the personal data based on encryption parameters comprising both an encryption key string formed using at least policy data indicative of conditions, differing from recipient identity, to be satisfied before access is given to said personal data, and public data provided by the second computing entity and related to private data of the latter; and a communications interface for providing the encrypted data to the third computing entity;

the second computing entity comprises a data store for holding said private data; a communications interface for receiving the encryption key string and for providing a corresponding decryption key to the third computing entity; a decryption-key determination unit for using the private data and the received encryption key string to determine the corresponding decryption key for decrypting the encrypted data; and a condition-checking arrangement for ensuring that the decryption key is only determined, or only provided to the third computing entity, after the conditions in said policy data have been satisfied in respect of the third computing entity.

According to a further aspect of the present invention, there is provided a computing entity arranged to act as a trusted party, the computing entity comprising:

a data store for holding private data;

a communications interface for receiving an encryption key string and for outputting a corresponding decryption key to a requesting entity; the encryption key string being formed using at least policy data indicative of conditions, differing from recipient identity, to be satisfied before access is given to data encrypted with the key;

a decryption-key determination unit for using the private data and a received encryption key string to determine a corresponding decryption key for decrypting data encrypted using the encryption key string and public data derived using said private data; and a condition-checking arrangement for ensuring that the decryption key is only determined, or only output via the communications interface, upon the conditions in said policy data being satisfied in respect of the requesting entity.

BRIEF DESCRIPTION OF THE DRAWINGS

Embodiments of the invention will now be described, by way of non-limiting example, with reference to the accompanying diagrammatic drawings, in which.

BEST MODE OF CARRYING OUT THE INVENTION

Figure 3:
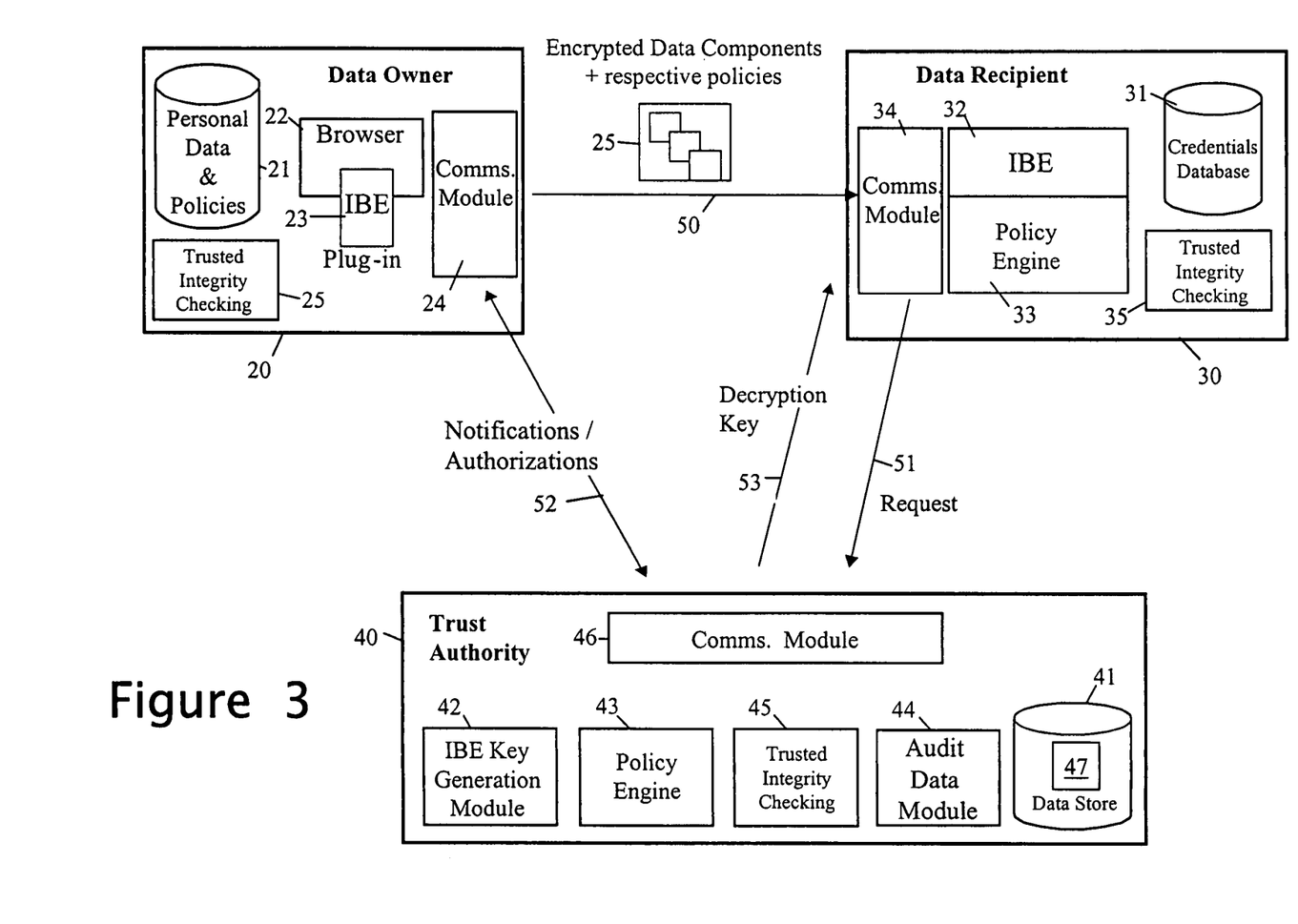
FIG. 3 is a diagram of an embodiment of the present invention.

FIG. 3 illustrates a privacy management system in which a data-owner computing entity 20 is arranged to encrypt personal data and send it to a data-recipient computing entity 30 which then requests a decryption key from a trust authority computing entity 40 and, on receipt of the key, decrypts and uses the personal data. The computing entities 20, 30 and 40 inter-communicate, for example, via the internet or other computer network though it is also possible that two or all three entities actually reside on the same computing platform.

Figure 1:
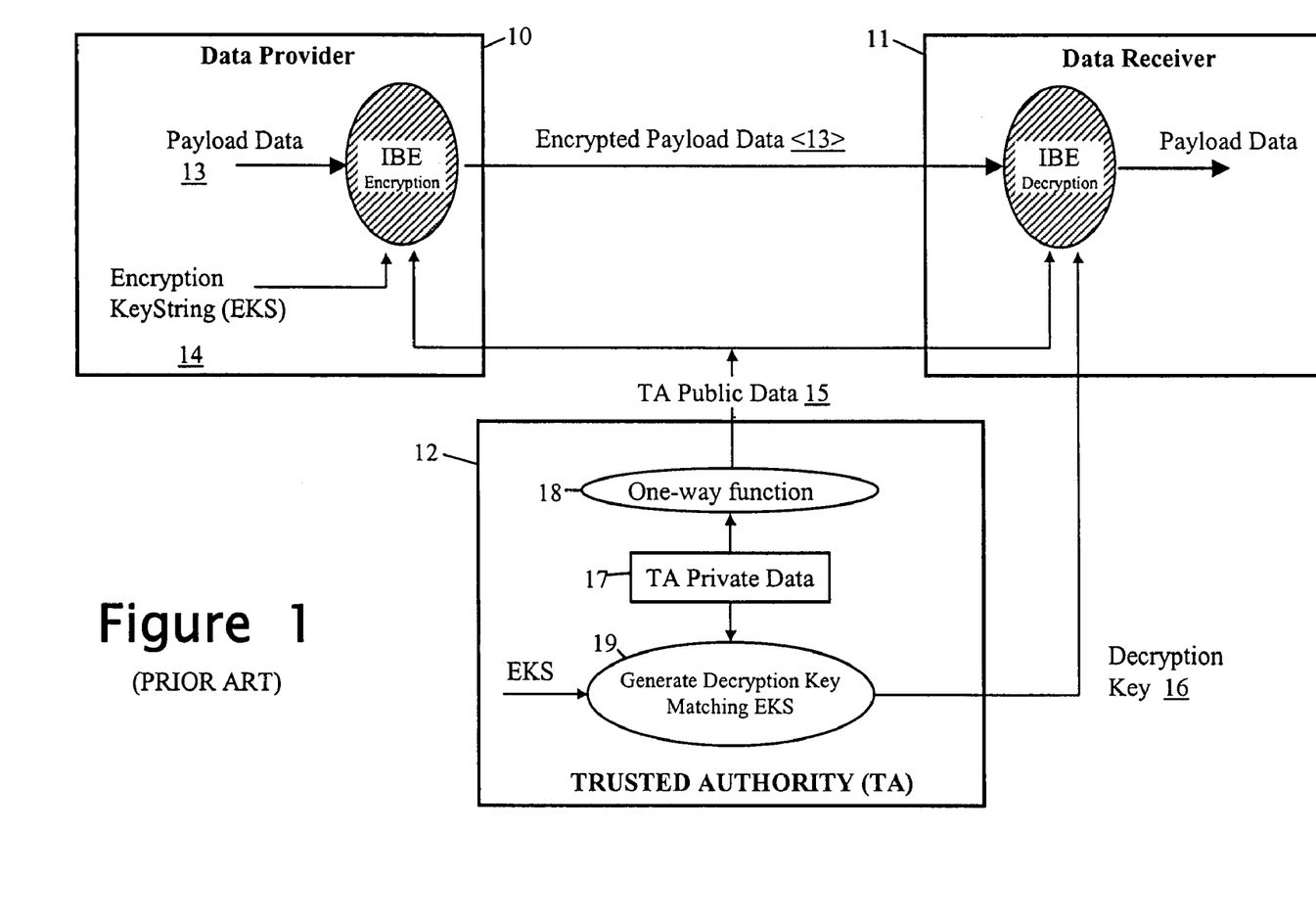
FIG. 1 is a diagram illustrating the operation of a prior art encryption schema known as Identifier-Based Encryption.

The system employs Identifier-Based Encryption with the computing entities 20, 30 and 40 having the roles of the data provider 10, data recipient 111 and trusted authority 12 of the FIG. 1 IBE arrangement. The IBE algorithm used is, for example, the QR algorithm described above with respect to FIG. 1. The encryption key string used to encrypt the personal data is a privacy/disclosure policy setting out conditions that must be satisfied before access is given to the personal data. This policy and the related personal data is made available in any suitable manner (including by direct peer-to-peer communication, by e-mail, or by posting on a public site) to the data recipient entity 30. In the FIG. 3 example, the policy and related personal data are depicted as being sent in a data package 25 directly to the data recipient entity 30 (see arrow 50). On receipt, the entity 30 forwards the policy to the trust authority entity 40 with a request for a decryption key (see arrow 51). The trust authority entity 40 is then responsible for ensuring that all the conditions of the policy have been met either before it generates the decryption key, or before it supplies the decryption key to the recipient entity 30 (see arrow 53). One possible condition involves the trust authority entity 40 communicating with the owner entity 20 (see arrow 52) either simply to notify the latter or to obtain authorisation to proceed with the provision of the decryption key to the recipient entity 30. Advantageously, the trust authority entity keeps an auditable record of its interactions with the recipient entity. The trust authority entity will typically serve multiple data recipient entities in respect of data from multiple data owner entities.

More particularly, the data-owner 20 entity comprises a data store 21 for holding personal data and related disclosure policies, a browser 22 providing a user interface for managing interaction with the recipient entity 30, and a communications module 24 for communicating with the other entities 30, 40. The browser 22 has a plug-in 23 that provides the IBE functionality needed by the entity 20, this plug-in 22 being provided, for example, by the trust authority entity 40. Where the QR IBE method is being used, the plug-in thus contains the public data N and the hash function # together with program code for encrypting data using N and an encryption key string formed by the disclosure policy relevant to the data concerned.

Preferably, the personal data is divided into multiple components each with its own disclosure policy whereby different conditions can be set on different items of personal data. The data package 25 out by the entity 20 may include one or more personal-data components and their related policies.

With respect to the or each policy, such a policy can include conditions relating to:

the strength of cryptographic methods to be employed in authenticating the identity of recipient before the decryption key is provided to the latter.

the expiry date of the policy or of the personal data, the trusted authority being arranged not to the decryption key when the expiry date has passed.

a security parameter of a computing platform being used by the recipient.

an action to be performed by the trust authority entity such as communicating with the owner, the trusted party effecting this communication before providing the decryption key to said recipient.

Other types of condition are also possible.

Figure 4:
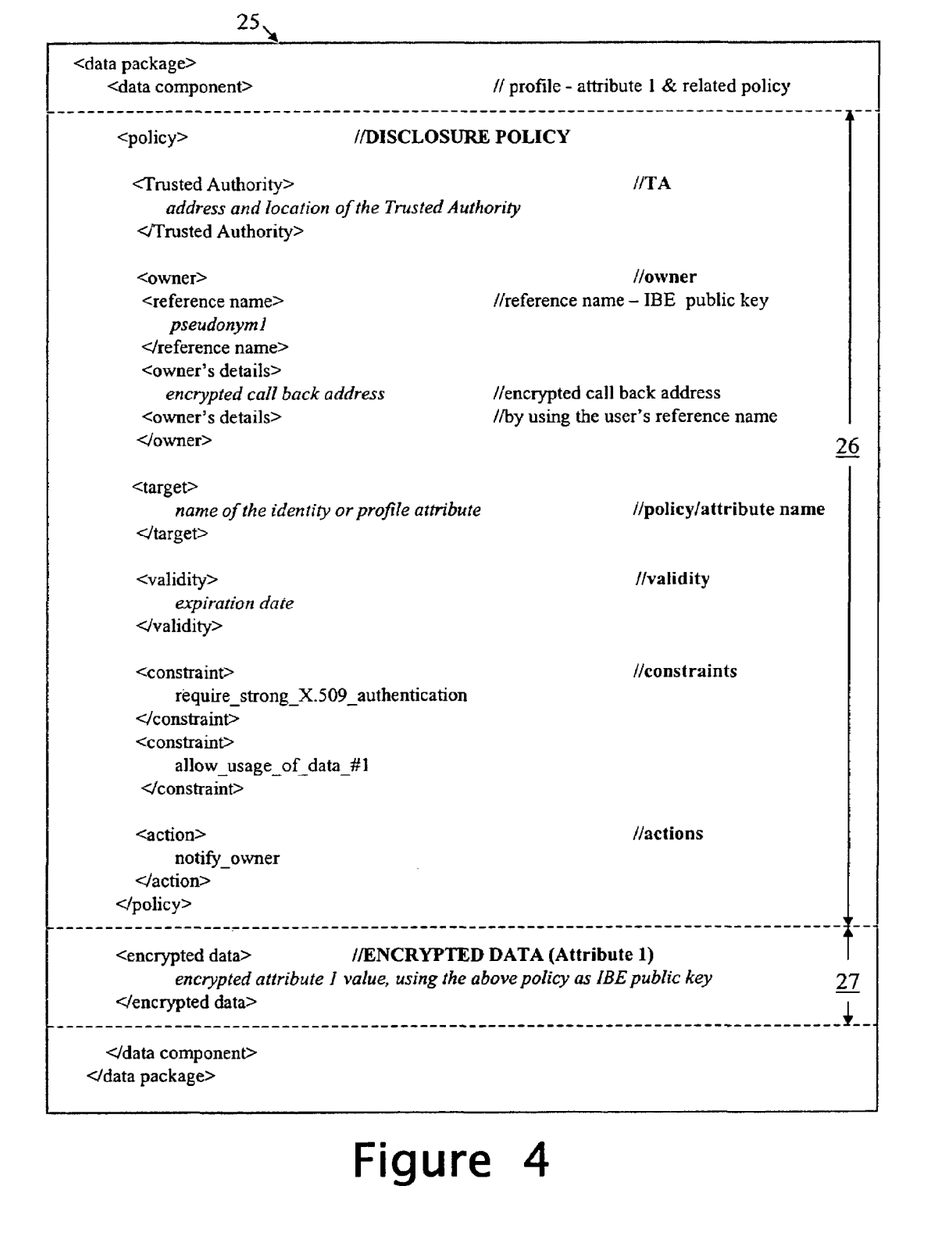
FIG. 4 shows an XML-format message comprising a privacy policy and data encrypted using the policy as the encryption key string according to the IBE schema.

The policies can be expressed in any suitable language, for example XML. FIG. 4 shows an example data package 25 in XML format for one data component (attribute 1); as can be seen the package comprises a policy section 26 and an encrypted data section 27 (the dashed lines simply being included to delimit these sections for the purpose of clarity).

The policy illustrated in the policy section 26 of the FIG. 4 data package 25 comprises:

An encrypted "identifier" of owner (see "owner details" tag). This can be any information, including the owner's e-mail address, URL, etc. In this example, a "reference name" (a pseudonym, for example) has been used as an IBE encryption key to encrypt this information. Only the competent trust authority entity 40 will be able to retrieve the owner's identifier (and use it, for example, to notify the owner of a disclosure or ask for an authorization).

The name of the attached confidential attribute (see "target" tag);

An expiration date for the policy or associated attribute data (see "validity" tag): after this date the trust authority entity 40 is required not to issue the decryption key;

Policy conditions divided into constraints and actions: the constrains require the recipient entity 30 to strongly authenticate itself to the trust authority entity 40, and specify the usage of the attribute. The action condition requires the trust authority entity to notify the user of a disclosure.

Any kind of condition can be added, as long as the trust authority and the recipient entity can understand its semantic. The format adopted for the policy in its form included in the data package 25 and its form used as the IBE encryption key string need not be the same provided the forms used are known to the entities who have a need to know.

Considering next the data recipient entity 30, this comprises a credentials database 31, an IBE decryption module 32, a policy engine 33 and a communications module for communicating with the entities 20 and 30. On receipt of the data package 25, the policy engine 33 programmatically interprets the associated disclosure policies in order to determine what information (including authentication credentials, business related information, company/individual policy related to data disclosure, usage and storage, software state, platform configuration etc.) it will need to provide to the trust authority entity 40. The policy engine 33 is then responsible for sending to the entity 40, in respect of each encrypted personal-data component, a request for the decryption key, this request being accompanied by the relevant policy and the information which the engine believes is required from it to satisfy the conditions in the policy.

The receiving entity is thus explicitly aware of the conditions put on access to the encrypted data.

The trust authority entity 40 comprises a data store 41, a decryption key generation module 42, a policy engine 43 (different in functionality to that of the entity 30), an audit data module 44, and a communications module 46 for communicating with entities 20 and 30. On receiving a request for a decryption key from the entity 30, the policy engine 43 of the trust authority programmatically interprets the conditions in the associated policy and determines whether the information provided by the entity 30 in the request satisfies all the conditions in the policy that are satisfiable by the entity 30. The policy engine 43 may determine that the information given is inadequate and may send back a query to the entity for further information. Certain conditions in the policy may not rely on information from the entity 30 to be satisfied; one such condition is an action condition requiring the entity 40 to notify the data-owner entity 20 or to seek its explicit authorisation for release of the decryption key concerned.

If and when the policy engine 43 is satisfied that all policy conditions have been met, it causes the key generation module 42 to generate the required decryption key from the policy (acting as the corresponding encryption key string) and the private data (the value N in the case of the QR IBE method) securely stored in store 41. The decryption key is then sent back to the entity 30. However, if one or more of the policy conditions is not satisfied, the entity 40 notifies the entity 30 accordingly and does not generate or output the requested decryption key.

It will be appreciated that rather than the entity 30 providing the information required for satisfaction of policy conditions in the decryption-key request, this information can be requested by the entity 40 as required to satisfy each condition as it is inspected by the policy engine 43. Furthermore, the decryption key can be generated at the same time as, or even before, the policy conditions are checked; in this case, the decryption key is not, however, released until the conditions are all found to be satisfied.

Whether or not a decryption-key request is successful, the audit data module 44 generates an audit record 47 comprising the identities of the entities 20 and 30, the personal-data component concerned and the information used to satisfy—or failing to satisfy—each policy condition. This audit record 47 is stored in store 41 to provide an audit trail regarding the disclosure of personal data and attempted accesses to it; this audit trail can be used latter as evidence for future contentions or forensic analysis.

Thus, if the recipient entity 30 discloses data in a way that is not allowed by the policies, there is an audit trail at the trust authority entity 40 showing that the entity 30 knew about the policy. In case of identity or profile thefts, the audit information can be used to pin down a list of potential "offenders" and carry on forensic analysis. Enforcing the tracing and auditing of disclosures makes the information recipients more accountable.

The trust authority entity 40 is the most suitable place to implement tracing and auditing activities as data recipients 30 need to interact with the trust authority entity 40 to obtain an IBE decryption key.

It should be noted that once personal data has been disclosed to a recipient entity 30 and it is in clear text (at the recipient site), it can potentially be misused. However, the provision of audit information in described system facilitates the identification of the source of any abuses.

In the foregoing example of a data package 25 given with respect to FIG. 4, only one data component and one associated policy is shown. However, it will be appreciated that the data package can contain multiple data components each with its own associated policy in which case the trust authority entity 40 is arranged to provide a corresponding number of decryption keys each subject to the satisfaction of the conditions in the corresponding policy. Of course, the same policy can be applied to multiple items of the personal data. Furthermore, it is possible to provide a set of policies where two or more policies can be used in combination to protect a particular item of personal data whilst a different combination of policies can be used to protect a different item of personal data.

Figure 5:
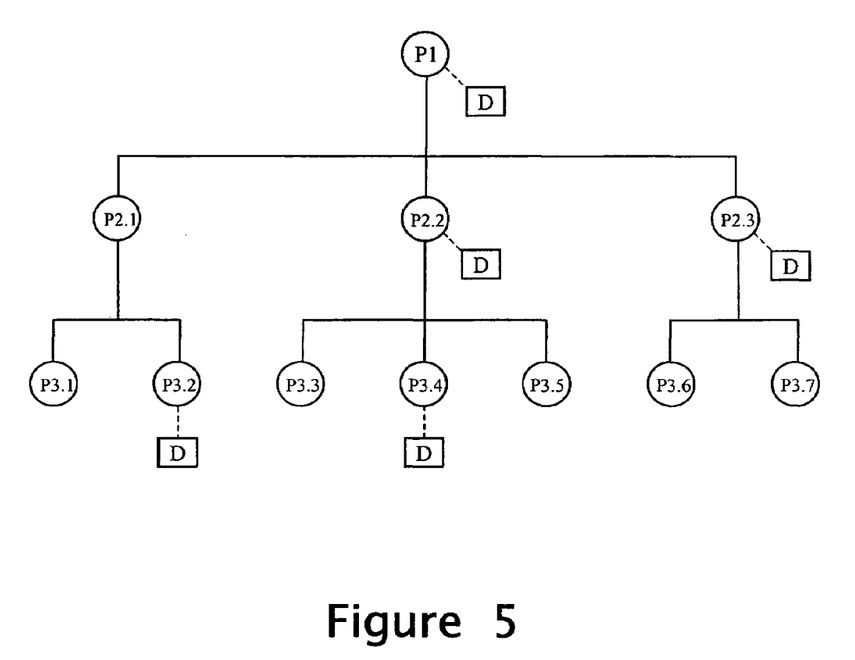
FIG. 5 is a diagram of a policy hierarchy.

FIG. 5 depicts a set of policies organised as a tree-structured hierarchy with policy P1 forming the root (first level) node to apply to all data, policies P2.1, P2.2 and P2.3, forming second-level nodes, and policies P3.1 to P3.7 forming third-level nodes. Data items to be encrypted are associated with one or more of the nodes (as indicated by the rectangular boxes "D" and dashed lines in FIG. 5). To encrypt any particular data item, either a "policy concatenation" or a "policy nesting" approach is applied, as explained below:

Policy Concatenation—with this approach, all the policies traversed from the root node to the node with which the data item concerned is associated, are concatenated (in their order of traversal or the reverse order), and the concatenated policies are then used as the encryption key string for encrypting the data item.

Policy Nesting—with this approach, the policy of the node with which the data item concerned is associated, is used to encrypt the data item and the encrypted data item then becomes a data item associated with the parent node of the node just used. In their turn the data items of the parent node are encrypted (either individually, or all together) using the corresponding policy to become one or more data items for the node above, and so on. This approach requires encryption to be initiated from the bottom up (that is, starting at the leaf nodes)

In both cases, each policy may specify any appropriate trust authority though, in the "policy concatenation" approach, if the policies being concatenated specify different trust authorities, one is selected to be used for the concatenation.

In one example of a hierarchy of policies where "policy concatenation" is applied, the second-level policies are used as class policies that are to apply to respective different classes personal data items, and third-level policies are used as policies that are to apply to respective individual personal data items. In this case, items of personal data are only associated with the leaf (third-level) nodes so that every item of personal data is guarded by a combined policy made up of the concatenation of the root policy, the appropriate class (second level) policy and the appropriate individual (third level) policy; the combined policy forms the encryption key string for the data item and is used by the trust authority to derive the corresponding decryption key (after all the relevant policy conditions are satisfied). With this particular example in which data items are only associated with leaf nodes, it is still possible to dispense with the application of policy conditions at any one or more levels simply by arranging for one or more policies to be empty.

It will be appreciated that whilst it is preferable for the lower level policies to be consistent with the higher level ones, this is not essential as rules can be applied by the trust authority entity to resolve any policy conflicts—for example, a higher level policy can be arranged to overrule lower level policies (or vice versa), or a more specific policy condition can be arranged to overrule a more general one.

Although in FIG. 5, each data item "D" is shown as associated with a single node, it would also be possible to associate a data item with multiple nodes; this would be advantageous where different branches of the policy hierarchy related to different policy topics and it was desired to apply multiple topics to a data item. In this case, combining the policies encountered in traversing the hierarchy from its root to each node associated with a subject data item can be done in a number of different ways. For example, a "policy concatenation" approach can be applied to all such policies, possibly with the elimination of repeated policies (nodes traversed more than once). Another approach is to use "policy concatenation" for each traversal and then use each concatenated policy set to encrypt the data item in turn. Yet another approach would be to use "policy nesting" with each level in the hierarchy being taken in turn (from the bottom up) and the concerned policies at the same level each being used in turn for encryption.

To enable a multiparty transaction, the recipient entity 30 can be authorised (for example, in a policy condition) to pass the overall encrypted data or any encrypted component of it to a further party (or parties) who then must contact the trust authority for the decryption key; again the decryption key is only provided if the relevant policy conditions are satisfied in respect of this further party In passing on the received personal data, the recipient entity 30 may decide to further encrypt portions of this data by using additional policies and in this case the module 32 would be arranged to carry out both decryption and encryption operations. This further encryption performed by the entity 30 may be applied either to the decrypted personal data items from entity 20, or to the data items whilst still in their form as encrypted by the entity 20 (in which case, the policy or policies applied by the data-owner entity 20 can conveniently encompassed within the data encrypted by the recipient entity 30). The policies applied by the entity 30 are of its own choosing and, of course, may specify a different trust authority to that specified by the entity 20. A further entity receiving the encrypted data from the entity 30 must use the trust authority specified by the entity 30 to obtain the decryption key(s) for unlocking the encryption applied by the entity 30; if this unlocked data comprises data encrypted by entity 20 and the relevant policy, then the further entity must now use the trust authority specified by the entity 20 to obtain the decryption key(s) to finally gain access to the personal data provided by entity 20.

As indicated in the foregoing discussions of the use of policies in combination and the passing on of personal data by the recipient entity 30 to another party, multiple trust authorities may need to be involved in providing access to the transmitted personal data. Of most interest is the situation where the provider of a particular item of personal data encrypts that data item in such a way that multiple trust authorities need to be involved to enable a receiving party to access the data item. One reason for doing this is that different trust authorities may have different competencies; for example, one trust authority may be competent to check platform security whilst another might be competent in the field of privacy. One way of requiring the involvement of multiple trust authorities is to use the "policy nesting" approach described above. However, it is also possible for the data provider to encrypt the data item using a key based on public data from each of multiple trust authorities (such public data being derived from private data of each trust authority), decryption of the encrypted item only being possible by obtaining a corresponding sub-key from each trust authority involved. Further information about how multiple trust authorities can be used is given in:

L. Chen, K. Harrison, A. Moss, D. Soldera, N. P. Smart, "Certification of Public Keys within an Identity Based System", LNCS 2433, ed. G. Goos, J. Hartmanis and J. van Leeuwen, Proceedings of Information Security, pp. 332-333, 2002.

Advantageously, one or more of the conditions of a policy require that the recipient entity 30 is a trusted platform with trusted integrity-checking mechanisms 35 that the trust authority entity 40 is to utilize to check that the software state of this platform is conformant with the disclosure policies, and that the platform correctly implements defined privacy management mechanisms. Suitable trusted mechanisms are described in:

TCPA—Trusted Computing Platform Alliance Main Specification v1.1, www.trustedcomputing.org, 2001.

The presence of trusted integrity-checking mechanisms 35 in the recipient entity 30 also permits the latter to be checked out by the data owner before any personal data is sent; such a check may be an alternative to, or additional to, the trust authority checking the recipient entity (it may be desirable for checking to be done both by the data owner and the trust authority since the state of the recipient entity may change between when the encrypted personal data is sent to the recipient and when it decides to access the data).

Preferably, one or both the computing entities 20 and 40 are also trusted platforms with TCPA integrity-checking mechanisms 25 and 45 respectively. In this case, one or more of the following further checks can be carried out:

the trust authority's computing platform to be checked out by the data owner to ensure that the trust authority will operate as expected;

the trust authority's computing platform to be checked out by the recipient of the data to help the recipient decide whether the trust authority can be trusted with the information that the recipient needs to provide in order for the decryption key to be issued;

where the data-owner's personal data is forwarded by the recipient entity 30 to another computing entity, then that further entity can check out the trust authority and, assuming that the further entity is itself provided with trusted integrity-monitoring mechanisms, the further entity can be checked out by the trust authority and the recipient entity 30;

the data owner's computer platform can be checked out by the trust authority or by the recipient entity.

The integrity-checking mechanisms 35 provided at the recipient entity 30 (or at any other subsequent recipient of the personal data of data-owner 20) can be used to effectively enforce proper handling of the personal data it receives, by requiring that the software state of the entity 30 corresponds to the use of software that can be trusted to operate in a predetermined manner (for example, a Trusted Operating Systems (OSs) or software with known behaviour that is being run in the absence of subversive software). Thus, where a Trusted OS can be arranged not to pass on data tagged in a certain manner to another entity, the data-owner entity can ensure that a particular data item is not disclosed beyond the recipient entity by tagging the data item in the appropriate manner and setting a policy condition to be checked by the trust authority, that the recipient entity must be running the Trusted OS before the decryption key is generated/provided to the entity 30.

Rather than the trust authority being separate from the data owner, the personal-data owner entity 20 can be arranged to run trust authority services itself in order to have first hand understanding of what happens to its information and make ultimate decisions about release of decryption keys. In this case, the personal-data owners can directly use a TCPA integrity challenge to check that the computing platform of the recipient has not been corrupted, before proceeding with the data disclosure. (It may be noted that where the owner entity and trust authority entity are combined, the so-called "public" data of the trust authority may not, in practice, be published outside of the combined entity; however, the term "private" is still apt to distinguish the data concerned from the private data of the trust authority).

It will be appreciated that many other variants are possible to the above described embodiments of the invention. For example, the recipient entity 30 may choose to cache a received decryption key to decrypt the data package 25 at a later date. Furthermore, in order to prevent the use of a decryption key in respect of more than one output of personal data by the entity 20, a nonce, i.e. a random number, can be incorporated into the policy at each transmission. This ensures that the encryption key string is unique thereby ensuring that the corresponding decryption key will also be unique.

Rather than the trust authority supplying the decryption key directly to the data recipient entity directly, the trust authority could send the key to the data-owner entity for forwarding to the data recipient entity.

Since in the FIG. 3 embodiment of the trust authority 40, an audit record is kept of the owner 20 and recipient 30 of a particular data item for which the recipient entity 30 has been provided the decryption key, if the trust authority 40 subsequently receives a request from a further entity for the decryption key for the same data item, the trust authority 40 can check whether the implied onward transmission of the data by the entity 30 may have breached a condition of the policy associated with the data item. For simplicity, the trust authority may assume that the data item had the same associated privacy policy when handled by the recipient 30 as when handled by the subsequently-requesting entity; in this case, the trust authority need only check the policy conditions in the later request to see if the recipient entity 30 had the right to pass on the data item. However, it is also possible for the trust authority 40 to record the policy under which the decryption key was released to the entity 30 and, in this case, the trust authority can checked the recorded policy for a condition preventing onward transmission. If a breach is indicated, then the trust authority 40 is preferably arranged not to release the decryption key and to log the event (it may also immediately notify the data owner). Of course, even if the data item was disclosed to the recipient entity 30 under a policy forbidding onward disclosure, it is possible for the later-requesting entity to have legitimately received the data item as the data item may have been provided to the later-requesting entity by a different party (such as the data owner) having the right to do so; care therefore needs to be taken as to how the trust authority carries out the policy compliance check just described. In fact, inappropriate refusal to supply a decryption key can be largely avoided by having the party making the request for the decryption key, indicate from whom it received the data item; this additional information enables the trust authority to determine what policy was applicable to the party passing on the data item to the requesting party. An alternative would be to uniquely number each usage of a policy by the data owner (for example, by including a usage serial number or a nonce in the policy) so that where a request is made for a decryption key that is accompanied by the policy used as the encryption key string, it is simple matter for the trust authority to check its audit records for any previous requests regarding the same policy usage and thus determine any breaches of a non-disclosure condition of the policy.

It will be appreciated that instead of the QR IBE method, the above-described embodiment can be implemented using any other suitable IBE algorithm, such as those mentioned above that use of Weil or Tate pairings, or are RSA based.

The above-described privacy management system can be used in any area of application including e-commerce, financial, government and enterprise areas.

The invention claimed is:

1. A privacy management method, comprising:
   first operations, effected by an owner of personal data, comprising:
      encrypting that data based on encryption parameters comprising public data provided by a trusted party, and an encryption key string formed using at least policy data constituted by a first form of a policy indicative of conditions to be satisfied before access is given to said personal data, and
      providing the encrypted data to a recipient together with a second form of said policy, the first and second forms of the policy being different from each other;
   second operations, effected by the trusted party, comprising using the encryption key string and private data, cryptographically related to said public data, to determine a decryption key, and outputting this key; at least one of these second operations only being effected after a further second operation has checked that said conditions are satisfied regarding said recipient.

2. A method according to claim 1, wherein the first operations further comprise providing the encryption key string to said recipient along with the encrypted data; the method further comprising intermediate operations in which the recipient provides the trusted party with the encryption key string and requests the decryption key.

3. A method according to claim 1, wherein the first operations further comprise providing details of the trusted party to said recipient along with the encrypted data.

4. A method according to any one of claims 1, further comprising said recipient sending on the encrypted personal data to a further party, and the trusted party providing the decryption key to that further party only after said conditions have been satisfied in respect of that further party.

5. A method according to claim 1, wherein in said first operations multiple items of personal data are encrypted each using said public data and a respective encryption key string formed using at least respective policy data; the encrypted multiple items being provided to said recipient; and wherein in the second operations the trusted party determines the decryption key for at least one encrypted item using the corresponding encryption key string and said private data, the or each determined decryption key only being provided to said recipient after the conditions in the corresponding policy data have been satisfied.

6. A method according to claim 5, further comprising said recipient sending on a selected subset of said multiple encrypted items of personal data to a further party; and the trusted party providing to that further party a decryption key for an encrypted item provided to that party, only after the conditions in the corresponding policy data have been satisfied in respect of said further party.

7. A method according to claim 1, wherein the data owner has a set of policies that form respective nodes in a policy hierarchy, and wherein in said first operations, multiple items of personal data are encrypted and provided to said recipient, each such data item being independently associated with at least one node of the policy hierarchy and being encrypted using said public data and policy data formed by a concatenation of the policies of the nodes traversed between the root of the hierarchy and the said at least one node with which the data item is associated.

8. A method according to claim 1, wherein the data owner has a set of policies that form respective nodes in a policy hierarchy, and wherein in said first operations, multiple items of personal data are encrypted and provided to said recipient, each such data item being independently associated with at least one node of the policy hierarchy and being encrypted by an iterative process in which:
   the data item is encrypted using said public data and policy data formed by the policy of the said at least one associated node,
   the encrypted data thus produced then becoming a data item associated with the parent node of the or each node formed by the policy just used for encryption.

9. A method according to claim 1, wherein in said first operations, multiple items of personal data are encrypted and provided to said recipient, at least two of these data items being encrypted using public data of different respective trusted parties whereby the recipient must obtain the appropriate decryption key from a different one of the trusted parties in dependence on which data item the recipient wishes to access.

10. A method according to claim 1, wherein in said first operations an item of personal data is first encrypted using a first policy and the public data of a first trusted party with the encrypted data being then further encrypted using a second policy and the public data of a second trusted party whereby the recipient must obtain decryption keys from the two trusted parties in order to access the data item.

11. A method according to claim 1, wherein in said first operations the personal data is encrypted using public data provided by multiple trusted parties, the second operations being carried out by each of said multiple trusted parties to provide a respective decryption sub-key whereby to enable the recipient to decrypt the encrypted personal data by the combined use of the sub-keys from each trust authority; each trusted party ensuring that policy conditions for which it is competent have been satisfied before generating and/or outputting the corresponding sub-key.

12. A method according to claim 1, wherein the trusted party makes an audit record of each provision of a decryption key by the trusted party.

13. A method according to claim 12, wherein said audit record further comprises information about when a decryption key is not provided because a related policy condition has not been satisfied, this information including information about the condition failure.

14. A method according to claim 12, wherein the trusted party on receiving a request from a party for a decryption key in respect of a particular item of data, checks its audit records to ascertain whether the decryption key for that item has previously been provided to a different party, and if so, whether the policy associated with the data item permitted onward disclosure.

15. A method according to claim 14, wherein the trusted party, on determining that the decryption key for the data item was previously provided under a policy of no onward disclosure, refuses to provide the decryption key to the requesting party.

16. A method according to claim 1, wherein the first and second operations are repeated multiple times for the same or different personal data owned by the same or different personal-data owners and provided to the same or different recipients.

17. A method according to claim 16, wherein the trusted party makes an audit record of each provision of a decryption key by the trusted party.

18. A method according to claim 17, wherein said audit record comprises the identity of the personal data, personal-data owner and recipient concerned.

19. A method according to claim 17, wherein said audit record further comprises information about when a decryption key is not provided because a related policy condition has not been satisfied, this information including information about the condition failure.

20. A method according to claim 17, wherein the trusted party on receiving a request from a party for a decryption key in respect of a particular item of data, checks its audit records to ascertain whether the decryption key for that item has previously been provided to a different party, and if so, whether the policy associated with the data item permitted onward disclosure.

21. A method according to claim 20, wherein the trusted party, on determining that the decryption key for the data item was previously provided under a policy of no onward disclosure, refuses to provide the decryption key to the requesting party.

22. A method according to claim 1, wherein a said policy condition relates to the strength of cryptographic methods to be employed in authenticating the identity of the recipient before the decryption key is provided to the latter.

23. A method according to claim 1, wherein a said policy condition relates to the expiry date of the policy or of the personal data, the trusted party not providing the decryption key when the expiry date has passed.

24. A method according to claim 1, wherein a said policy condition relates to the trusted party communicating with the owner, the trusted party effecting this communication before providing the decryption key to said recipient.

25. A method according to claim 24, wherein the condition is that the trusted party obtain consent from the owner before providing the decryption key to said recipient.

26. A method according to claim 24, wherein contact details for the owner are contained in policy data in encrypted form, the contact details being encrypted using said public data of the trusted party and an encryption key string formed by a data element also included in the policy data whereby the trusted party can form the corresponding decryption key and decrypt the encrypted contact details.

27. A method according to claim 1, wherein a said policy condition relates to a computing platform being used by the recipient being a trusted platform running software of predetermined functionality that cannot be subverted.

28. A method according to claim 1, wherein the trusted party checks that any party requesting the decryption key is using a trusted computing platform running software of predetermined functionality that cannot be subverted.

29. A method according to claim 1, wherein the data owner, before providing the encrypted data to the recipient, checks that the latter is using a trusted computing platform running software of predetermined functionality that cannot be subverted.

30. A method according to claim 27, wherein the software being run by the computing entity of the recipient is arranged to prevent onward disclosure of data indicated in a predetermined manner, the data owner marking an item of personal data in this predetermined way before providing it to the recipient.

31. A method according to claim 1, wherein the data owner, before providing the encrypted data to the recipient, checks that the trust authority is using a trusted computing platform running software of predetermined functionality that cannot be subverted.

32. A method according to claim 1, wherein the recipient, before providing the trust authority with any data concerning itself for the purpose of satisfying a said condition, checks that the trusted party is using a trusted computing platform running software of predetermined functionality that cannot be subverted.

33. A method according to claim 1, wherein the recipient, before providing any personal data received from the data owner to another party, checks that the latter is using a trusted computing platform running software of predetermined functionality that cannot be subverted.

34. A method according to claim 1, wherein the owner of the personal data also serves as the trusted party.

35. A method according to claim 1, wherein said owner is acting as a proxy for a party to whom the personal data relates.

36. A method according to claim 1, wherein in the second operations the decryption key is not determined until after said conditions have been satisfied.

37. A privacy management system comprising first, second and third computing entities, wherein:
  the first computing entity comprises: a data store for holding personal data; an encryption unit for encrypting the personal data based on encryption parameters comprising both public data provided by the second computing entity and an encryption key string formed using at least policy data constituted by a first form of a policy indicative of conditions to be satisfied before access is given to the personal data; and a communications interface for providing the encrypted data to the third computing entity together with a second form of said policy, the first and second forms of the policy being different from each other;
  the second computing entity comprises a data store for holding private data cryptographically related to said public data; a communications interface for receiving the encryption key string and for providing a corresponding decryption key to the third computing entity; a decryption-key determination unit for using the private data and the received encryption key string to determine the corresponding decryption key for decrypting the encrypted data; and a condition-checking arrangement for ensuring that the decryption key is only determined, or only provided to the third computing entity, after the conditions in said policy data have been satisfied in respect of the third computing entity.

38. A system according to claim 37, wherein the first computing entity is arranged to provide the encryption key string to the third computing entity along with the encrypted data; the third computing entity being arranged to request the decryption key from the second computing entity and provide it with the encryption key string.

39. A system according to claim 37, further comprising a fourth computing entity, the third computing entity being arranged to send on the encrypted personal data to the fourth computing entity, and the second computing entity being arranged to provide the decryption key to the fourth computing entity only after said conditions have been satisfied in respect of that fourth computing entity.

40. A system according to claim 37, wherein the second computing entity is arranged to make an audit record of each provision of the decryption key by the second computing entity.

41. A system according to claim 40, wherein the second computing entity is arranged to include in the audit record, information about when a decryption key is not provided because a related policy condition has not been satisfied, this information including information about the condition failure.

42. A system according to claim 40, wherein the second computing entity is so arranged that upon receiving a request from a party for a decryption key in respect of a particular item of data, it checks its audit records to ascertain whether the decryption key for that item has previously been provided to a different party, and if so, whether the policy associated with the data item permitted onward disclosure.

43. A system according to claim 37, further comprising multiple first and third computing entities, the second computing entity being arranged to provide decryption keys for the third computing entities in respect of personal data encrypted by the first computing entities provided the corresponding policy conditions have been satisfied in each case.

44. A system according to claim 37, wherein the second computing entity is arranged to make an audit record of each provision of a decryption key by the second computing entity.

45. A system according to claim 44, wherein said audit record comprises the identity of the first and third computing entities concerned with each provision of a decryption key.

46. A system according to claim 44, wherein the second computing entity is arranged to include in the audit record, information about when a decryption key is not provided because a related policy condition has not been satisfied, this information including information about the condition failure.

47. A system according to claim 44, wherein the second computing entity is so arranged that upon receiving a request from a party for a decryption key in respect of a particular item of data, it checks its audit records to ascertain whether the decryption key for that item has previously been provided to a different party, and if so, whether the policy associated with the data item permitted onward disclosure.

48. A system according to claim 37, wherein a said policy condition relates to the second computing entity communicating with the first computing, the second computing entity being arranged to effect this communication before providing the decryption key to said third computing entity.

49. A system according to claim 48, wherein the condition is that the second computing entity obtain consent from the first computing entity before providing the decryption key to the third computing entity.

50. A system according to claim 48, wherein contact details of the first computing entity are included in said policy data in encrypted form, the contact details being encrypted using said public data and an encryption key string formed by a data element also included in the policy data whereby the second computing entity can form the corresponding decryption key and decrypt the encrypted contact details.

51. A system according to claim 37, wherein a said policy condition relates to the third computing entity being a trusted platform running software of predetermined functionality that cannot be subverted.

52. A system according to claim 37, wherein the first and second computing entities are combined.

53. A computing entity arranged to act as a trusted party, the computing entity comprising:
  a data store for holding private data;
  a communications interface for receiving an encryption key string being formed using at least policy data constituted by a first form of a policy indicative of conditions to be satisfied before access is given to the private data, and for receiving a second form of said policy, the first and second forms of the policy being different from each other, and for outputting a decryption key corresponding to the encryption key string to a requesting entity;

a decryption-key determination unit for using the private data and a received encryption key string to determine a corresponding decryption key for decrypting data encrypted using the encryption key string and public data derived using said private data, said private data being cryptographically related to said public data; and a condition-checking arrangement for ensuring that the decryption key is only determined, or only output via the communications interface, upon the conditions in said policy data being satisfied in respect of the requesting entity.

54. A computing entity according to claim 53, further comprising an audit-trail arrangement for making an audit record of each output of a decryption key to a requesting entity.

55. A computing entity according to claim 54, wherein the audit-trail arrangement is arranged to include in the audit record information about when a decryption key is not provided because a related policy condition has not been satisfied, this information including information about the condition failure.

56. A computing entity according to claim 54, in which the audit-trail arrangement is arranged, in response to the computing entity receiving a request from a party for a decryption key in respect of a particular item of data, to checks its audit records to ascertain whether the decryption key for that item has previously been provided to a different party, and if so, whether the policy associated with the data item permitted onward disclosure.

57. A computing entity according to claim 56, wherein the audit-trail arrangement is further arranged, on determining that the decryption key for the data item was previously provided under a policy of no onward disclosure, to block the generation and/or output of the decryption key.

58. A computing entity according to claim 53, wherein a said policy condition relates to the computing entity communicating with an owner of the encrypted data, the computing entity being arranged to effect this communication before generating and/or outputting the decryption key to the requesting entity.

59. A computing entity according to claim 58, wherein the condition is that the computing entity obtain consent from the owner of the encrypted data before providing the decryption key to the requesting entity.

60. A computing entity according to claim 53, wherein a said policy condition relates to the requesting entity being a trusted platform running software of predetermined functionality that cannot be subverted, the computing entity being arranged to communicate with the requesting entity to check this condition before generating and/or outputting the decryption key.

* * * * *